though the value of the condition signal drops below
United States Patent [19]

Diller

[11] Patent Number: 5,021,678
[45] Date of Patent: Jun. 4, 1991

[54] APPARATUS AND METHOD FOR ACTUATING A PASSENGER RESTRAINT SYSTEM IN A PASSENGER VEHICLE

[75] Inventor: Robert W. Diller, Pasadena, Calif.

[73] Assignee: TRW Technar Inc., Irwindale, Calif.

[21] Appl. No.: 431,545

[22] Filed: Nov. 3, 1989

[51] Int. Cl.⁵ .............................................. B60R 21/32
[52] U.S. Cl. .................................. 307/10.1; 280/734; 340/436; 340/669
[58] Field of Search ................. 307/9.1, 10.1; 180/282; 280/734; 340/436, 669

[56] References Cited

U.S. PATENT DOCUMENTS

| | | | |
|---|---|---|---|
| 3,870,894 | 3/1975 | Brede et al. | 307/9.1 |
| 3,911,391 | 10/1975 | Held et al. | 180/274 |
| 4,614,876 | 9/1986 | Mattes et al. | 180/282 |
| 4,723,078 | 2/1988 | Neuffer et al. | 180/282 |
| 4,851,705 | 7/1989 | Mosser et al. | 180/282 |

*Primary Examiner*—J. R. Scott
*Assistant Examiner*—Jeffrey A. Gaffin
*Attorney, Agent, or Firm*—Tarolli, Sundheim & Covell

[57] ABSTRACT

Apparatus and method are provided for actuating a passenger restraint system in a passenger vehicle. A sensor, such as an accelerometer, provides a vehicle condition signal indicative of a potential deployment condition suitable for actuating the restraint system. A first signal is provided so long as the value of the condition signal exceeds that of a first threshold level. An integrator is operative in response to the first signal for integrating the condition signal and providing an integrated signal. The integrator is normally operative to be reset upon termination of the first signal. A trigger signal is provided for actuating the restraint system when the value of the integrated signal exceeds that of a second threshold level. The integrator is prevented from being reset upon termination of the first signal once the first signal has had a time duration of at least time period T1. The integrator is reset after a time period T2 has taken place, wherein T2 had a duration greater than that of time period T1. Consequently, the integrator continues to integrate the condition signal during the interval between the termination of time period T1 and the termination of time period T2, even that of the first threshold level during the interval.

9 Claims, 3 Drawing Sheets

APPARATUS AND METHOD FOR ACTUATING A PASSENGER RESTRAINT SYSTEM IN A PASSENGER VEHICLE

BACKGROUND OF THE INVENTION

1. Technical Field

The present invention is directed to controlling actuation of a vehicle passenger restraint system and is particularly directed to evaluating whether a vehicle crash condition is sufficient to warrant actuation of the restraint system.

2. Prior Art

Actuatable passenger restraint systems for vehicles are well known in the art. Such systems are used to sense a crash condition and, in response to such a condition, to actuate an airbag or lock a seat belt or actuate a pretensioner for a seat belt retractor.

The U.S. Pat. No. 3,870,894 to U. Brede et al. discloses an actuatable passenger restraint system employing an electrical transducer for providing an electrical signal indicative of a deployment condition, such as vehicle deceleration, for use in actuating such a restraint system. The transducer employed is a piezoelectric transducer operating as an accelerometer and provides an output signal having a value indicative of vehicle deceleration. That signal is then integrated and, when the integrated signal reaches a predetermined value, a trigger signal is provided for actuating the restraint system. However, if the output signal of the accelerometer decreases, the integrator is reset and the circuitry is conditioned for sensing another crash condition.

The U.S. Pat. No. 3,911,391 to M. Held is similar to that of Brede et al., but specifically provides that the integration of the output signal of the accelerometer will only commence when the output signal exceeds some minimum threshold level, thereby preventing triggering of the restraint system for deceleration values that can be safely absorbed by passengers in a vehicle.

The above noted patents to Brede et al. and Held have no provision for providing a trigger signal to actuate a restraint system when the output signal of the accelerometer momentarily falls below a minimum threshold value even though the output signal may have been greater than this level for a time duration indicative of a potentially valid crash condition.

SUMMARY OF THE INVENTION

The present invention is directed to improvements for controlling the triggering of a passenger restraint system employing an integrator and operating it in such a manner that when a potentially valid crash condition is being sensed the integrator will not be reset when the output signal of the sensor means, such as an accelerometer, has a momentary decrease in value below the minimum threshold level before which integration can take place.

In accordance with the present invention, apparatus is provided for actuating a passenger restraint system in a passenger vehicle. The apparatus includes a sensor for providing a condition signal indicative of a deployment condition, such as vehicle deceleration, for actuating the restraint system. A first signal is provided so long as the value of the condition signal exceeds that of a first threshold level. An integrator is operative in response to the first signal for integrating the condition signal and providing an integrated signal and is normally operative to be reset upon termination of the first signal. A trigger signal is provided for actuating the restraint system when the value of the integrated signal exceeds that of a second threshold level. The integrator is prevented from being reset upon termination of the first signal once the first signal has had a time duration of at least time period T1. The integrator is reset after a time period T2 has taken place, wherein T2 has a duration greater than that of time period T1. In this manner, the integrating means continues to integrate the condition signal during the interval between termination of time period T1 and termination of time period T2, even though the value of the condition signal drops below that of the first threshold level during the interval.

Further in accordance with the present invention, the condition signal is representative of vehicle deceleration and the integrated signal is representative of velocity.

Still further in accordance with the present invention, the integrating means performs a double integration such that the integrated signal is representative of displacement.

In accordance with another aspect of the invention, a method is provided for developing a trigger signal for actuating a passenger restraint system in a passenger vehicle during a vehicle crash condition. The method includes sensing the magnitude of vehicle deceleration and providing a condition signal having a value which varies with that of the vehicle deceleration. The condition signal is integrated so long as the value of the condition signal exceeds that of a first threshold level for a first time period T1. The integrating of the condition signal continues for a second period of time subsequent to that of time period T1 even though the value of the condition signal falls below the value of the first threshold level. The trigger signal is provided whenever the integrated signal exceeds that of a second threshold level.

BRIEF DESCRIPTION OF THE DRAWINGS

The foregoing and other features and advantages of the present invention will become more apparent to those skilled in the art, to which the present invention relates, from a reading of the following description of preferred embodiments with reference to the accompanying drawings, in which.

DETAILED DESCRIPTION OF A PREFERRED EMBODIMENT

Figure 1:
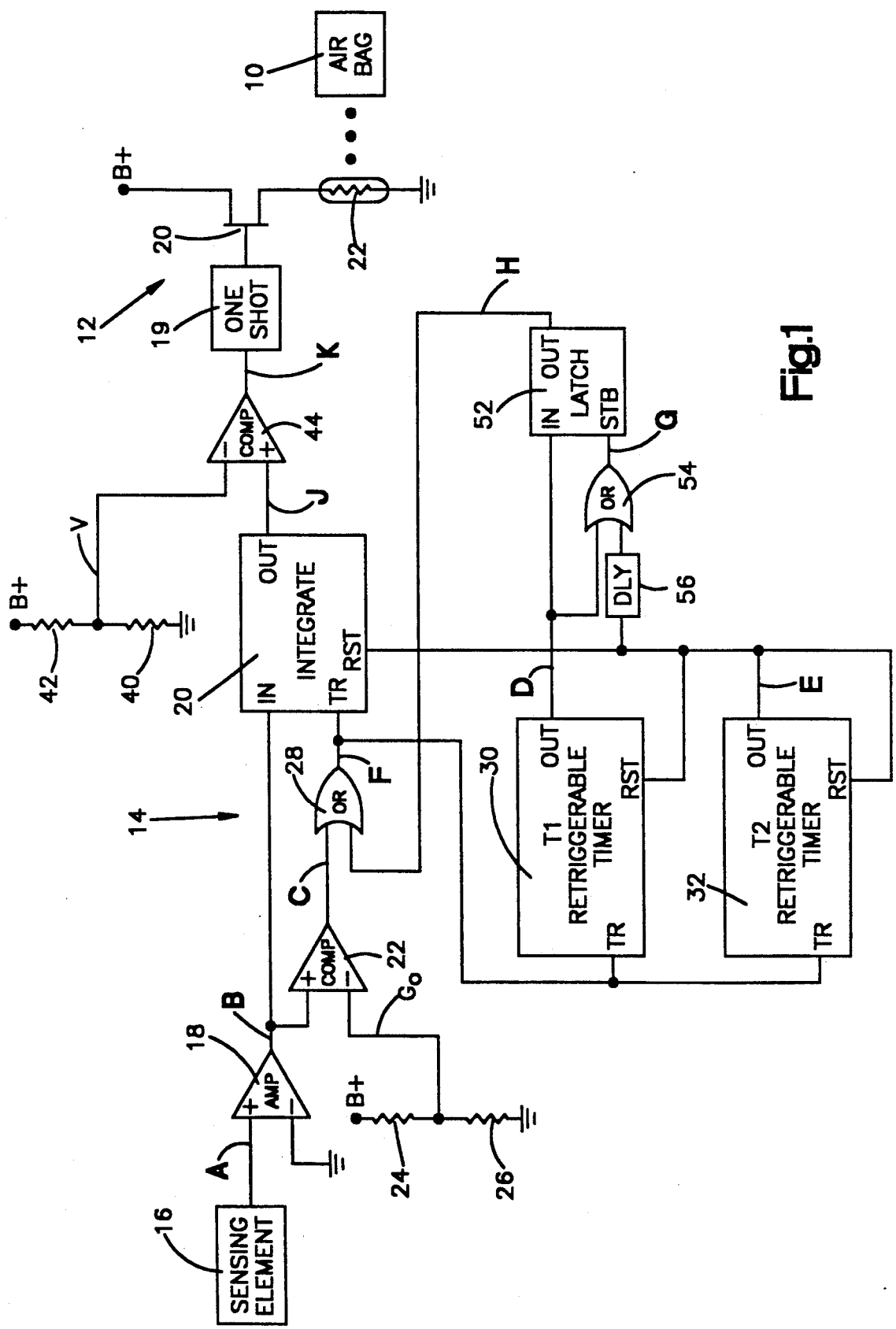
FIG. 1 is a schematic-block diagram illustration in accordance with the present invention.

Reference is now made to the drawings and particularly to FIG. 1 which illustrates apparatus in accordance with the present invention for actuating a passenger restraint system in a passenger vehicle wherein the restraint system includes an airbag 10 actuated by a firing circuit 12 once an evaluation circuit 14 has determined that a valid crash is occurring. The evaluation circuit 14 is connected to the output of a sensing element 16 which provides a vehicle condition signal indicative of a potential deployment condition for actuating the airbag 10. The condition signal provided by the sensing element 16 is a voltage signal having a value which varies with that of the deceleration of the vehicle. The evaluation circuit 14 makes an analysis of the condition signal. When circuit 14 decides that a valid crash is occurring, it applies a trigger signal to the firing circuit 12.

As illustrated in FIG. 1, the firing circuit 12 includes a one-shot circuit 19 which, upon receiving a trigger signal from the evaluation circuit, provides a firing signal. The firing signal is maintained for a fixed duration of time sufficient to turn on a transistor switch taking the form of a field-effect transistor 20 having its drain to source circuit connected in series with a B+ voltage supply source and a squib 22 associated with the airbag 10. Once gated into conduction, the switching transistor 20 provides sufficient current for a sufficient period of time to ignite the squib 22 and deploy or inflate the airbag 10 in a known manner.

The sensing element 16 in the embodiment of FIG. 1 preferably takes the form of an accelerometer of the piezoresistive transducer type and is available commercially from ICSensors, 1701 McCarthy Blvd., Milpitas, California 95035 under Model No. 3021.

Figure 2:
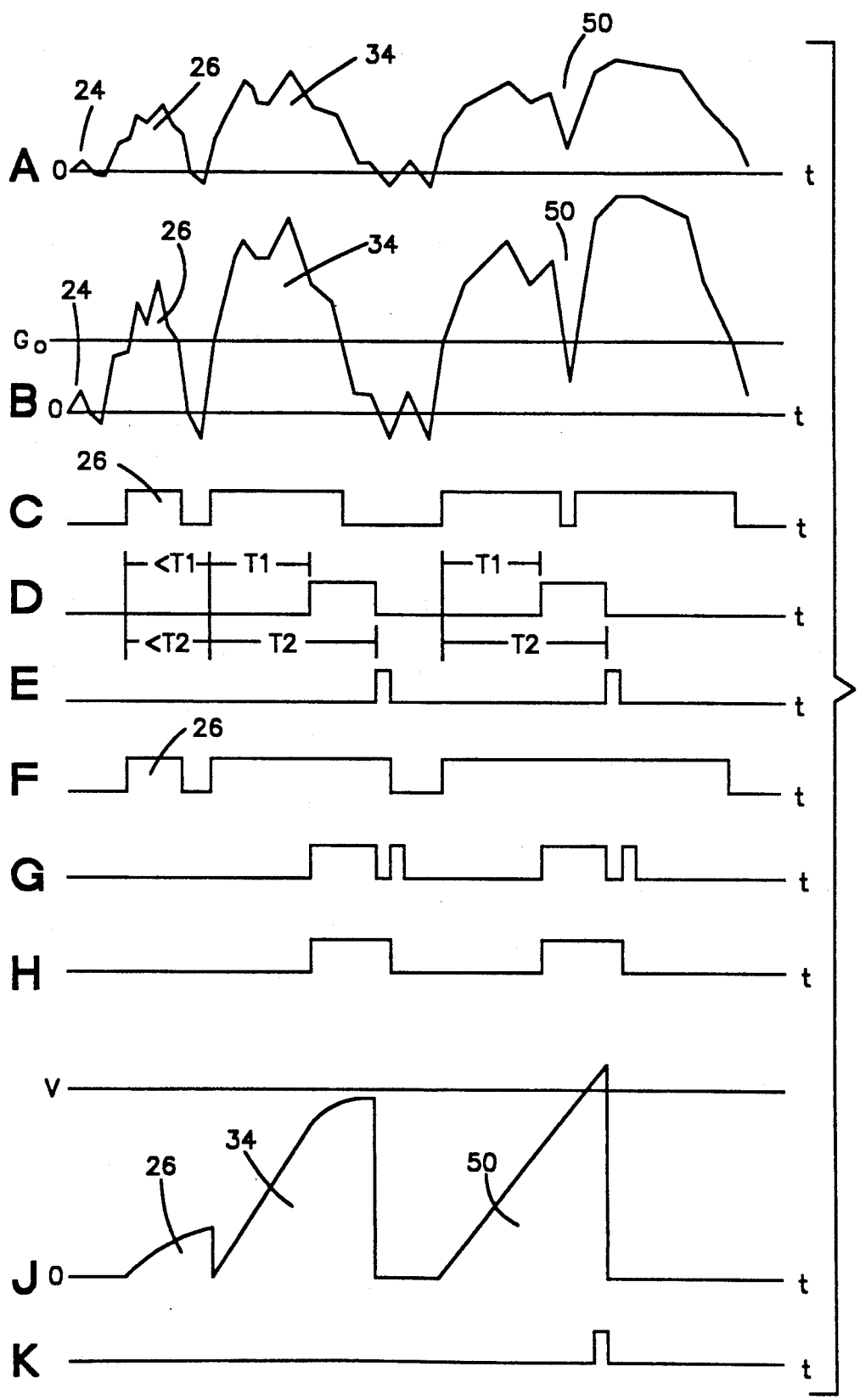
FIG. 2 presents waveforms A through K which are representative of certain voltage values present at various points of the circuit illustrated in FIG. 1 and which are useful in describing the operation of the invention herein.

During vehicle deceleration, the sensing element 16 provides an output signal representative of the deceleration of the vehicle. An illustration of this output signal is represented in FIG. 2 by the waveform A of voltage with respect to time. Waveforms B through K of FIG. 2, like waveform A, all represent voltage levels with respect to time at various points in the circuitry of FIG. 1 with the points having a corresponding label, i.e., points A through K. These waveforms will be of assistance in understanding the operation of the evaluation circuit 14 to be described below.

The condition signal, in this case a deceleration signal, obtained from the sensing element 16 is amplified by an amplifier 18. The amplified signal is then supplied to the input of integrator 20 which, when triggered on, will integrate the amplified deceleration signal.

For a deceleration signal to be representative of a potentially valid crash condition, it should exceed some minimum threshold level, $G_o$, representative of a deceleration on the order of, for example, 5g. Decelerations of a lesser amplitude are considered herein as not being of sufficient magnitude to warrant consideration by the evaluation circuit 14 to determine if a valid crash condition exists. Consequently, the amplified deceleration signal is compared with a minimum threshold level $G_o$ by means of a comparator 22. The threshold level $G_o$ may be obtained from a voltage divider including resistors 24 and 26 connected between ground and a B+ voltage supply source. As seen by reference to the waveforms B and C, the comparator 22 will provide a positive output signal only so long as the magnitude of the amplified deceleration signal exceeds that of the minimum threshold level $G_o$. Thus, a low amplitude deceleration signal, such as that represented by waveform portion 24 in waveforms A and B, is not of sufficient magnitude to be recognized by the comparator 22. The output of the comparator remains low, as is shown in waveform C, so as not to trigger the integrator 20.

Once the amplified deceleration signal increases in magnitude beyond the minimum threshold level $G_o$, as is shown in portion 26 of the waveform B, the output of the comparator goes high and stays high so long as this condition continues, as is indicated by the positive signal at portion 26 of waveform C. This positive signal may be representative of a potentially valid crash condition. Hence, the signal is passed by an OR gate 28, as is seen by portion 26 in waveform F, to the trigger input of the integrator 20. The integrator 20 will now commence integration of the amplified deceleration signal supplied to its input and will output an integrated signal, as is seen at portion 26 of the waveform J in FIG. 2.

In order for an amplified deceleration signal that exceeds the minimum threshold level $G_o$ to be considered as a potentially valid crash condition, it should exceed the minimum threshold level for some minimum time duration T1, such as on the order of 5 milliseconds. This is to prevent short term signals, which might result from hammer or maintenance shocks in the neighborhood of the sensor, from actuating the vehicle restraint system. Consequently, at the same time that the OR gate 28 triggers the integrator 20 to commence integration of the amplified deceleration signal, it also triggers a timer 30 to commence timing a period corresponding to time duration T1 and then produce a positive signal at its output.

At this point, it should be recognized that the integrator 20 and the timer 30 as well as an additional timer 32, to be discussed hereinafter, are each of the type employing a retrigerable input, labelled TR. This means each of these circuits can be reset and started by the presence of a positive going edge signal at its input TR. In other words, the integrator 20 will be reset and begin to integrate when a positive edge signal is applied to its input TR and will continue to integrate until the application of another positive edge signal. Similarly, timers 30 and 32 will commence timing a time duration when a positive edge signal is applied to their respective inputs TR and will continue to time until reset and restarted by another positive edge signal. Each of the circuits 20, 30 and 32 also has an input designated RST which indicates that a positive edge signal applied to that input will cause the circuit to be reset without restart. That is, when a positive edge signal is supplied to the reset input RST of integrator 20, for example, the integrator is reset. However, no positive edge signal applied to that input will cause the integrator to restart and commence integrating.

As discussed above, once the amplified deceleration signal exceeds a minimum threshold $G_o$, the integrator 20 commences to integrate the signal and supply an integrated output signal and the timer 30 commences timing a time period T1. This takes place on the positive-going edge of the output signal from comparator 22. In the first situation under consideration by the evaluation circuit, as defined by the waveform portion 26, the amplified deceleration signal is above the minimum threshold level $G_o$ for a time duration less than that of time period T1. Consequently, the output of timer 30 does not go positive. Once the deceleration signal decreases below that of the minimum threshold level $G_o$, the output of the comparator goes low and, on its next positive edge, it resets the integrator 20 and timers 30 and 32, as is indicated in the waveforms C, D, E and J of FIG. 2. Note from waveforms D and E that there is no positive output pulse from either timer during this condition, since the timers were reset and never timed out. The foregoing illustrates the operation of the evaluation circuit 14 when a deceleration signal, as indicated by waveform portion 26 in waveforms A and B, is not of greater magnitude than the minimum threshold level $G_o$ for a sufficiently long period of time T1 to be considered as a potentially valid crash condition.

A third condition which may be examined by the evaluation circuit 14 is that represented by portion 34 in waveforms A and B. The magnitude of the amplified deceleration signal is greater than the minimum threshold level $G_o$ for a time duration greater than that of time period T1. This is representative of a potentially valid crash condition. If the magnitude of the output integrated signal from the integrator 20 also exceeds a threshold level V within a time period T2 from the commencement of the integration operation, the restraint system will be deployed. The time period T2 is indicative of the maximum duration from inception of a crash during which the evaluation circuit 14 should determine if the magnitude is sufficient to actuate the vehicle restraint system. Time period T2 may be on the order of 100 milliseconds. The magnitude of the threshold level V represents a fictitious velocity which is not directly related to the velocity of the crash and is determined by examining empirical crash data which varies with the type of vehicle involved. For purposes of illustration, the fictitious velocity level V may be considered as five miles per hour.

The threshold level V may be obtained from a voltage divider including a pair of resistors 40 and 42 connected between ground and a B+ voltage supply source and is supplied to one input of a comparator 44. When the integrated signal provided at the output of the integrator 20 exceeds the threshold level V, a trigger signal is supplied by the comparator to actuate firing circuit 12 and deploy the airbag 10.

In accordance with the present invention, the evaluation circuitry 14 evaluates the deceleration signal to see whether the signal is of sufficient magnitude and duration that it represents a potentially valid crash. This is accomplished, as in the case of the deceleration signal at portion 34 of the waveforms, by determining that the amplified deceleration signal exceeded the minimum threshold level $G_o$ for a time duration greater than or at least equal to time period T1. Thereafter and prior to the termination of time duration T2, the evaluation circuit will continue to determine whether the integrated signal exceeds the threshold level V even though the magnitude of the amplified deceleration signal decreases below minimum theshold level $G_o$. It is during the time interval between the termination of time period T1 and the termination of time period T2 that the integrator 20 is prevented from being reset. This prevents termination of evaluating an otherwise potentially valid crash condition merely because of a momentary drop in the magnitude of the deceleration signal, as is the case represented by waveform portion 50 to be discussed hereinafter.

The circuitry to prevent the integrator 20 from being reset and thereby terminating the evaluation once it has been determined that a potentially valid crash condition is taking place will now be described. Once the timer 30 has timed out, its output circuit will go positive, as indicated by the waveform D in FIG. 2. This positive signal is supplied to the input of a latch circuit 52. The latch circuit 52 has a strobe input designated STB which, upon receiving a positive edge signal, will strobe the signal applied to its input terminal IN to its output terminal OUT and latch it there until subsequently reset. When the output of the timer 30 goes high, it applies a positive-going signal to the input terminal IN of the latch circuit 52 and also supplies a positive signal by way of an OR gate 54 to the strobe input STB. This causes a positive signal to be applied through the OR gate 28 to maintain a positive signal on the trigger input TR of the integrator 20 even though the output of the comparator 22 now goes low. The integrator 20 will continue to integrate the signal represented by waveform portion 34, once timer 30 has timed out, and will continue integrating the signal even though the magnitude of the signal decreases below the minimum threshold level $G_o$.

In the meantime, the timer 32 continues to time the time period T2 and upon the completion of this timing period, it provides a positive output signal, as indicated in waveform E. The positive edge signal is applied to the reset input RST of timer 30 and to the reset input RST of integrator 20 as well as to its own RST input. This resets timers 30 and 32 and resets integrator 20. In the case under consideration, by evaluation circuit 14, the integrated output signal of waveform portion 34 did not exceed the threshold level V. In such case, the restraint system is not actuated. The evaluation circuit has determined that the condition being evaluated indicated that a potentially valid crash condition for deploying the restraint system took place because the deceleration signal exceeded the minimum threshold level $G_o$ for a time duration greater than time period T1, but the magnitude of the condition was not sufficient for the integrated signal to exceed the threshold level V before the time period T2 expired.

Reference is now made to waveform portion 50 in waveforms A and B of FIG. 2. As will be described below, this crash condition is sufficient in magnitude that the amplified deceleration signal exceeds the minimum threshold level $G_o$ for a time duration greater than time T1 and, hence, is considered a potentially valid crash condition for actuating the restraint system. However, the amplified deceleration signal momentarily drops below the minimum threshold level $G_o$ during the interval after the time period T1 has expired and before the time period T2 has expired. Thereafter, the deceleration signal increased in magnitude well beyond the minimum threshold level $G_o$. Such a momentary decrease in the deceleration signal may happen during a valid crash condition otherwise requiring that the restraint system be actuated. During a valid crash condition, various vibrations of an erratic nature may take place as the vehicle structure is deforming. Consequently, a momentary decrease in the deceleration signal below the minimum threshold level $G_o$ in an otherwise valid crash condition requiring deployment of the restraint system should not cause the integrator to be reset and thereby not activate the firing circuit 12.

In accordance with the present invention, the condition discussed immediately above with respect to waveform portion 50 does not cause the integrator 20 to be reset. Thus, once the timer 30 has timed out the time period T1, it produces a positive-going signal at its output circuit. This positive-going signal is latched through the latch circuit 52, as previously discussed, to maintain a positive signal applied to the input TR of the integrator 20 even though the output of the comparator 22 goes low. The integrator 20 continues to integrate the amplified deceleration signal and the comparator 44 continues to compare the integrated signal from the output of the integrator with the threshold level V. In the situation under consideration, the integrated signal exceeded the magnitude of the threshold level V before timer 32 has timed out, thereby supplying a trigger signal to actuate the firing circuit 12 causing the airbag 10 to be deployed.

Once timer 32 times out, it resets timer 30 and integrator 20 and itself, as discussed hereinabove. The output of timer 30 now goes low, and the output from the timer is supplied to the input terminal IN of the latch circuit 52. To ensure that the signal to the input terminal IN of latch circuit 52 is low before the signal is strobed to the output circuit of the latch circuit, the positive-going signal from the timer 32 is delayed somewhat with a delay circuit 56 before being applied to the strobe input STB of the latch circuit. When the positive-going signal is applied to the strobe input STB, the output of the latch circuit goes low and the low output signal is applied through OR gate 28 so that its output then follows that of comparator 22. Moreover, by resetting the integrator after time T2, the integrator is prevented from accumulating integrated signals from one evaluation of a crash condition to the next.

Figure 3:
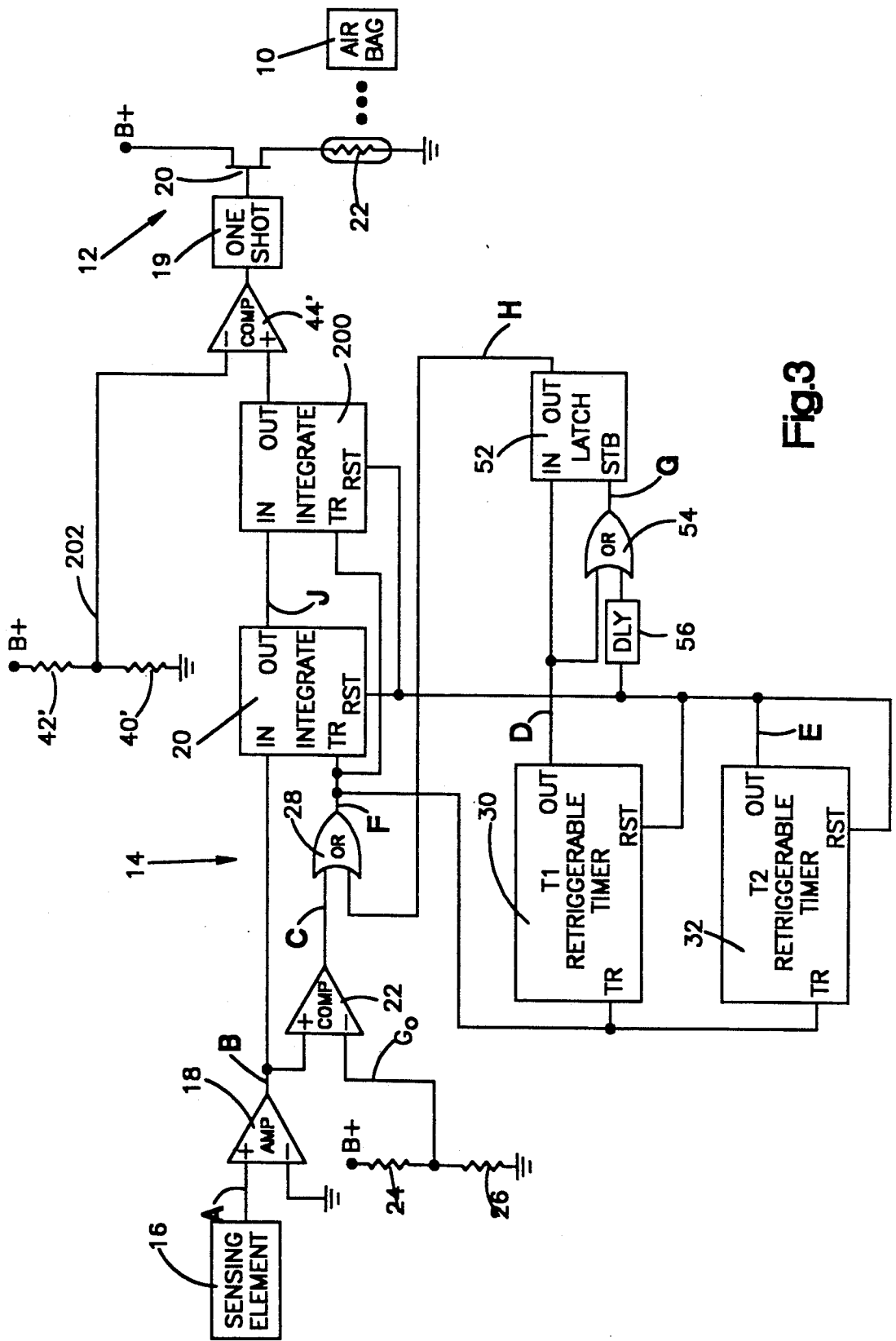
FIG. 3 is a schematic-block diagram similar to that illustated in FIG. 1 but illustrating a second embodiment of the invention.

Reference is now made to FIG. 3 which presents another embodiment of the invention similar to that illustrated in FIGS. 1 and 2. In view of the similarities, like components in FIGS. 1 and 3 are identified with like character references. Only the differences will be discussed in detail below.

The embodiment of the invention illustrated in FIG. 3 provides a second integrator 200 which is identical to integrator 20 but performs a second integration so that the output of integrator 200 represents a fictitious distance as opposed to the fictitious velocity represented by the output of integrator 20 in FIG. 1. Integrator 200 has its input terminal IN connected to the output terminal OUT of integrator 20. The trigger input TR of integrator 200 is connected to the trigger input TR of integrator 20 and the reset input RST of integrator 200 is connected to the reset input RST of integrator 20. Consequently, when integrator 20 is triggered or reset, the same occurs to integrator 200.

The operation of this embodiment is the same as that described with reference to FIGS. 1 and 2 except that a second integration is made to obtain a fictitious distance signal which is then compared with a trigger threshold level 202 by means of a comparator 44'. The threshold level 202 may be obtained as from a voltage divider including resistors 40' and 42' connected together in series between ground and a B+ voltage supply source. Once the output of comparator 44' goes positive, it will activate the one-shot circuit 19 in the firing circuit 12 causing the airbag 10 to be deployed.

Whereas the invention has been described in conjunction with preferred embodiments, it is to be appreciated that various modifications may be made without departing from the spirit and scope of the invention as defined by the appended claims.

Having described a preferred embodiment of the invention, I claim:

1. Apparatus for actuating a passenger restraint system in a passenger vehicle, comprising:
   sensor means for providing a vehicle condition signal indicative of a potential deployment condition suitable for actuating said restraint system;
   means for providing a first signal so long as the value of said condition signal exceeds that of a first threshold level;
   integrating means operative in response to said first signal for integrating said condition signal and providing an integrated signal and normally operative to be reset upon termination of said first signal;
   means for providing a trigger signal for actuating said restraint system when the value of said integrated signal exceeds that of a second threshold level;
   means for preventing said integrating means from being reset upon termination of said first signal once said first signal has had a time duration of at least time period T1;
   means for resetting said integrating means after a time period T2 has taken place, wherein T2 has a duration greater than that of time period T1, so that said integrating means continues to integrate said condition signal during the interval between termination of time period T1 and termination of time period T2, even though the value of the condition signal drops below that of the first threshold level during said interval.

2. Apparatus as set forth in claim 1 wherein said sensor means is an accelerometer and wherein said vehicle condition signal has a value which varies with vehicle deceleration.

3. Apparatus as set forth in claim 2 wherein said integrating means includes means for performing a double integration of said condition signal so that said integrated signal represents displacement.

4. Apparatus as set forth in claim 1 wherein said means for providing said trigger signal includes comparator means for providing said trigger signal when the value of said integrated signal exceeds that of said second threshold level.

5. Apparatus as set forth in claim 1 wherein said means for providing said first signal includes comparator means for providing said first signal so long as the value of said condition signal exceeds that of said first threshold level.

6. Apparatus as set forth in claim 1 wherein said means for preventing said integrating means from being reset includes resettable timer means operative in response to said first signal for timing said time period T1 and operative to be reset during said time period T1; and,
   means for preventing said integrating means from being reset until termination of said time period T2.

7. Apparatus as set forth in claim 1 wherein said means for resetting said integrating means includes a second timer means for timing the time period T2 and then providing a reset signal for resetting said integrating means.

8. A method for providing a trigger signal for actuating a passenger restraint system in a passenger vehicle during a vehicle crash condition and comprising the steps of:
   sensing the magnitude of vehicle deceleration and providing a condition signal having a value which varies with that of said vehicle deceleration;
   integrating said condition signal so long as the value of said condition signal exceeds that of a first threshold level for a first time period T1;
   continuing the integrating of said condition signal for a second period of time subsequent to that of time, period T1 even though the value of said condition signal falls below the value of said first threshold level during said second period of time; and
   providing said trigger signal whenever the value of said integrated signal exceeds that of a second threshold level.

9. A method as set forth in claim 8 wherein said steps of integrating said condition signal includes performing a double integration of said condition signal.

* * * * *